April 25, 1950 M. R. FAMIGLIETTI 2,505,733
SPRING SUSPENSION
Filed June 1, 1945 2 Sheets-Sheet 1
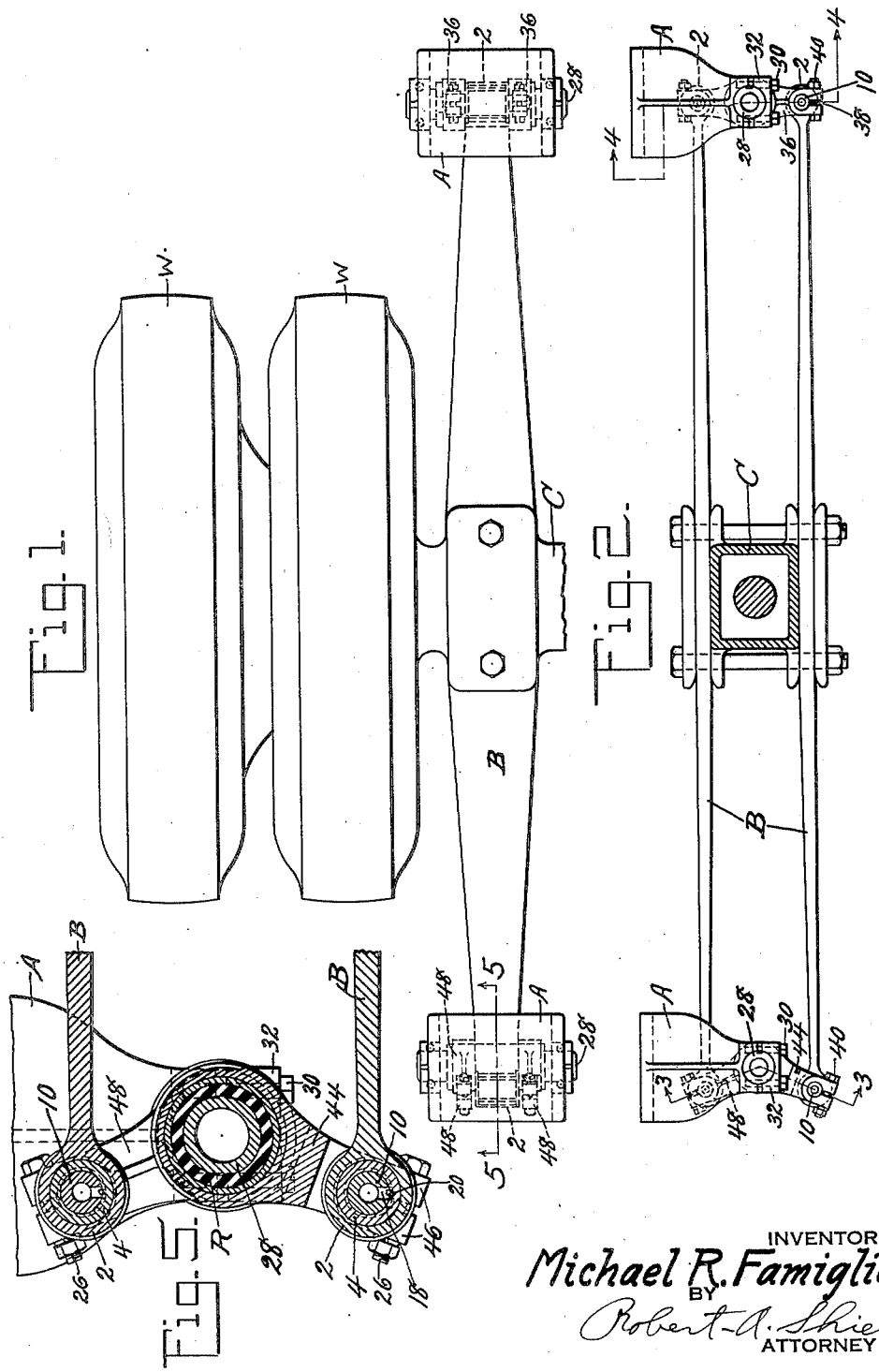
INVENTOR
Michael R. Famiglietti
BY
Robert A. Shields
ATTORNEY April 25, 1950     M. R. FAMIGLIETTI     2,505,733
SPRING SUSPENSION
Filed June 1, 1945     2 Sheets-Sheet 2

INVENTOR
Michael R. Famiglietti
BY
Robert A. Shields
ATTORNEY

Patented Apr. 25, 1950

2,505,733

UNITED STATES PATENT OFFICE 2,505,733

SPRING SUSPENSION

Michael R. Famiglietti, Aldan, Pa., assignor to ACF-Brill Motors Company, New York, N. Y., a corporation of Delaware Application June 1, 1945, Serial No. 597,131

1 Claim. (Cl. 267—54)

This invention relates in general to spring suspensions and in particular to spring suspensions which act to resist side sway and stabilize the vehicle.

In the past most spring suspensions have been so designed as to give approximately proper springing of the vehicle when subjected to vertically acting road shocks. This type of springing, however, was incapable of stabilizing the vehicle against sway since the springs would of themselves twist. It has recently been discovered that by proper design of the spring suspension it can serve not only to resiliently mount the vehicle, but to also act as a stabilizer resisting side sway and side thrusts. In other words, the new type of suspension is quite soft in one direction, while quite rigid in other directions. With such a suspension it becomes necessary to use some sort of resilient connection between the vehicle and spring system in order that the parts will not be over strained. It is an object, therefore, of the present invention to provide a spring suspension having resilient material incorporated therein which will permit resiliently controlled movement in all directions between the shackles and the supported body.

A still further object of the invention is the provision of a spring suspension having shackles including a resilient material capable of acting in compression, straight shear and torsional shear, either singly or simultaneously, to resist relative movement between a vehicle body and its mounting springs.

A yet further object of the invention is the provision of a spring suspension including resilient material acting as a sound deadening insulator between the vehicle springs and body.

These and other objects of the invention will be apparent to persons skilled in the art from a study of the following description and accompanying drawings, in which Fig. 1 is a plan view of a part of the vehicle suspension;

Fig. 2 is an elevational view of the suspension;

Fig. 5 is a sectional view taken substantially on line 5—5 of Fig. 1.

Figure 3:
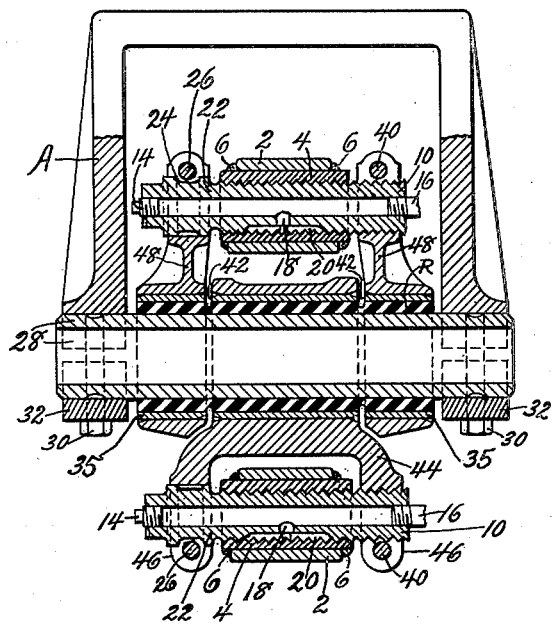
Fig. 3 is a sectional view taken substantially on line 3—3 of Fig. 2.

Referring now to the drawings in detail, it will be seen that the body supporting brackets A are connected by means of the special shackles to the ends of leaf springs B, one located above and one below the axle C to which they are rigidly clamped. The axle is supported by means of road or other wheels W. For a more complete description and understanding of the springs and their action reference may be had to Flogans application No. 568,281, filed December 15, 1944, now Patent No. 2,492,416, issued December 27, 1949. The springs are provided at each end with eyes 2 in which are pressed bush bearings 4, which bearings are welded to the spring as at 6 to prevent any relative motion between the spring eyes and the bush bearing. Each bush bearing is internally threaded as at 8 with an ordinary thread adapted to engage similar threads on a shackle pin 10. The shackle pins are of identical form and as shown are provided with an internal bore 12 which is threaded at either end to receive a pipe plug 14 or a grease fitting 16 of any standard or desired form. By so arranging the ends the plug and grease fitting may be interchanged so as to always place the grease fitting in the most accessible position. A grease hole 18 extends through the pin and connects the bore to a grease groove 20 extending across certain of the shackle pin threads and this grease groove is always disposed so that the grease will be forced onto the loaded side of the shackle pin. To insure such a placement of the groove during assembly suitable marks will be made on the ends of the shackle pin. As clearly shown, the external threads of the shackle pin extend from one end to a point adjacent the shackle pin shoulder 22. This shoulder is provided with a reduced portion 24 adapted to receive a clamping bolt 26 extending through the shackle side links.

Figure 4:
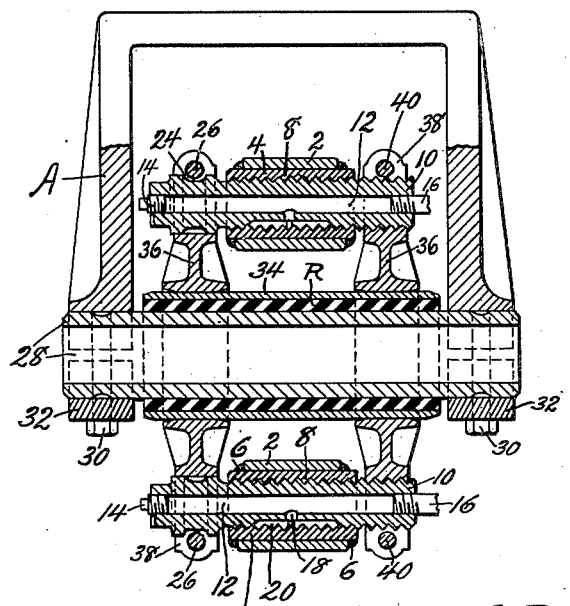
Fig. 4 is a sectional view taken substantially on line 4—4 of Fig. 2.

The weight of the vehicle is transferred to the rear ends of the springs by means of bracket A and spindle 28. The spindle 28 is clamped to bracket A by means of stud bolts 30 and cap 32. The spindle has grooves cut therein adjacent the ends and adapted to interengage with the stud bolts 30 so as to prevent any endwise motion of the spindle. This spindle or pivot tube is made hollow so as to lighten the structure and at the same time increase the surface by which heat generated in the resilient material may be dissipated. As shown the spindle or pivot tube has bonded thereto a resilient material such as rubber R. The outer surface of the resilient material is bonded or otherwise secured to a tube 34. At the forward ends of the springs (Fig. 4) the tube 34 has pressed thereon spaced shackle side links 36. These side links are rigid and extend in either direction from the tube and have their free ends adapted to receive the shackle pins 10. One of these side links is internally threaded to receive the threads of the shackle pin and this end is slit as at 38, whereby a bolt 40 may be tightened to rigidly clamp the shackle pin against turning. The ends of the other side link are formed to receive the shoulders of the shackle pin and these ends are likewise slit in order that the bolt 26 may be tightened to grip the shoulder end of the pin. It will thus be seen that at the forward ends of the springs the leaves are connected together by rigidly connected side links so that the spring leaves must move in unison, with such movement permitted by the resilient material acting to control such movement.

At the rear ends of the springs the spindle is fastened to the bracket A as at the forward end but the tube 34 may be cut at two places, such as 42, thus producing a central tube section and two shorter end tube sections 35 (Fig. 3). Upon the central tube portion a unitary shackle element 44 is pressed and this element is provided with integral arms 46 adapted to engage and grip the shackle pin 10 of the lower spring in exactly the same manner as just described in connection with the side links at the forward end of the spring. Accordingly, similar numerals have been applied. The short tubes 35 have pressed thereon independent shackle side links 48 and these side links also grip the shackle pin 10 of the upper spring in the same manner as do the side links of the forward shackle assembly. It will thus be seen that by this arrangement the springs at their rear ends may move relative to each other and relative to the vehicle frame under control of the resilient material. While the spindle or pivot tube with its resilient material R and tube 34 has been described as formed identically, with the tube 34 cut to produce the structure of Fig. 3, it will be obvious that these three tube parts may be formed separately and if desired the central tube section may be made slightly larger than the outer sections 35, thus facilitating pressing of the parts onto their respective tubes.

It is believed obvious from the preceding description that the shackle assemblies will each function to resist relative fore and aft movement of the springs by the resilient material acting in torsional shear. It will also be apparent that side thrusts will be resiliently absorbed by the material R acting in straight shear parallel to the axis of the spindle or pivot tube. Torsional strains arising through a tendency of the springs to twist in their length will impose compressive forces on the resilient material, as will also the static load of the vehicle. Thus the resilient material will act in compression, straight shear and torsional shear to resist all relative movements between the body and springs. This multiple working of the resilient material may develop considerable heat but any heat so developed will be rapidly dissipated by means of the hollow heat radiating sprindle or pivot tube.

While the spring suspension has been described more or less in detail with specific reference to the accompanying figures, it will be obvious to persons skilled in the art that various other arrangement and connection of parts may be made without departing from the scope of the invention as defined by the following claim.

What is claimed is:

A spring suspension comprising in part, spaced apart shackle arms having at least one of their ends bifurcated, a threaded shackle pin having threaded engagement with one arm and a plain bearing engagement with the other arm, bolts extending across the bifurcated ends of said arms and adapted to clamp said shackle pin to prevent its rotation, a threaded bushing rotatably mounted on the threaded shackle pin intermediate said shackle arms, and means for supplying lubricant to the bushing and shackle pin threads at the zone of highest load pressure.

MICHAEL R. FAMIGLIETTI.

REFERENCES CITED

The following references are of record in the file of this patent:

UNITED STATES PATENTS

| Number | Name | Date |
|---|---|---|
| 1,654,447 | Ballot | Dec. 27, 1927 |
| 1,788,061 | Kutsukian | Jan. 6, 1931 |
| 1,982,456 | Scarratt et al. | Nov. 27, 1934 |
| 1,985,709 | Zerk | Dec. 25, 1934 |
| 2,044,392 | Lord | June 16, 1936 |
| 2,253,436 | Leighton | Aug. 19, 1941 |
| 2,308,967 | Kuss | Jan. 19, 1943 |

FOREIGN PATENTS

| Number | Country | Date |
|---|---|---|
| 337,138 | Great Britain | Oct. 30, 1930 |
| 403,912 | Great Britain | Jan. 4, 1934 |